United States Defensive Publication [19] (H) [11] T967,002

Mihara et al. [43] Feb. 7, 1978

[54] SPECTRALLY SENSITIZED SILVER HALIDE PHOTOGRAPHIC EMULSIONS

[76] Inventors: Yuji Mihara; Takeo Sakai; Hideki Ohmatsu; Akira Sato, all of No. 210, Nakanuma, Minami-ashigara, Kanagawa, Japan

[21] Appl. No.: 815,751

[22] Filed: July 14, 1977

[30] Foreign Application Priority Data

July 14, 1976 Japan ..... 51-84320

[51] Int. Cl.[2] ..... G03C 5/24

[52] U.S. Cl. ..... 96/64; 96/94 R; 96/76 R; 96/100 R; 96/124; 96/126

[57] ABSTRACT

An internal latent image type silver halide photographic emulsion suitable for use in a light-sensitive material for the diffusion transfer process and which provides a direct positive image by surface development in the presence of a fogging agent, which emulsion is spectrally sensitized with a supersensitizing combination of at least on sensitizing dye represented by the following general formula (I)

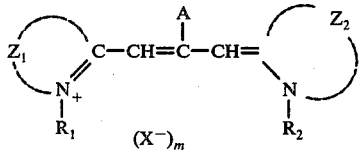

(I)

werein $Z_1$ represents a non-metallic atomic group necessary to complete a benzoxazole ring, a naphthoxazole ring, a benzothiazole ring, a naphthothiazole ring, a benzoselenazole ring or a benzimidazole ring; $Z_2$ represents a non-metallic atomic group necessary to complete a benzothiazole ring, a naphthothiazole ring or a benzoselenazole ring; A represents a hydrogen atom or an alkyl group; $R_1$ and $R_2$, which may be the same or different, each represents an alkyl group or a substituted alkyl group; X represents an acid anion; and m represents 0 or 1, and at least one sensitizing dye represented by the following general formula (II), (III) or (IV):

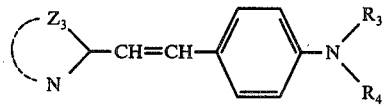

(II)

wherein $Z_3$ represents a non-metallic atomic group necessary to complete a 5- or 6-membered heterocyclic ring; and $R_3$ and $R_4$, which may be the same or different, each represents an alkyl group;

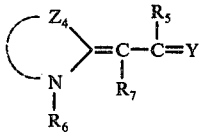

(III)

wherein $Z_4$ represents a non-metallic atomic group necessary to complete a 5- or 6-membered heterocyclic ring; $R_5$ represents an alkyl group; $R_6$ represents an alkyl group or a substituted alkyl group; $R_7$ represents a hydrogen atom or $R_6$ and $R_7$ can combine and form a ring and Y represents an oxygen atom or $=N-R_8$, wherein $R_8$ represents a hydrogen atom, an alkyl group or an aryl group,

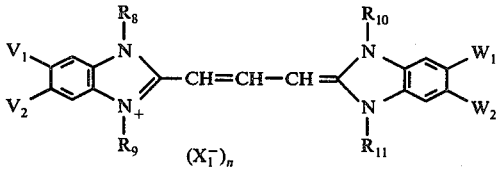

(IV)

wherein $V_1$, $V_2$, $W_1$ and $W_2$, which may be the same or different, each represents a hydrogen atom, a halogen atom, a trifluoromethyl group, a cyano group, a carboxy group, an alkoxycarbonyl group, an aminosulfonyl group or an alkylsulfonyl group; $R_8$, $R_9$, $R_{10}$ and $R_{11}$, which may be the same or different, each represents an alkyl group or a substituted alkyl group; $X_1$ represents an acid anion; and *n* represents 0 or 1.

10 Claims, 1 Sheet Drawing,

62 Pages Specification

The file of this unexamined application may be inspected and copies thereof may be purchased (849 O.G. 1221, Apr. 9, 1968).

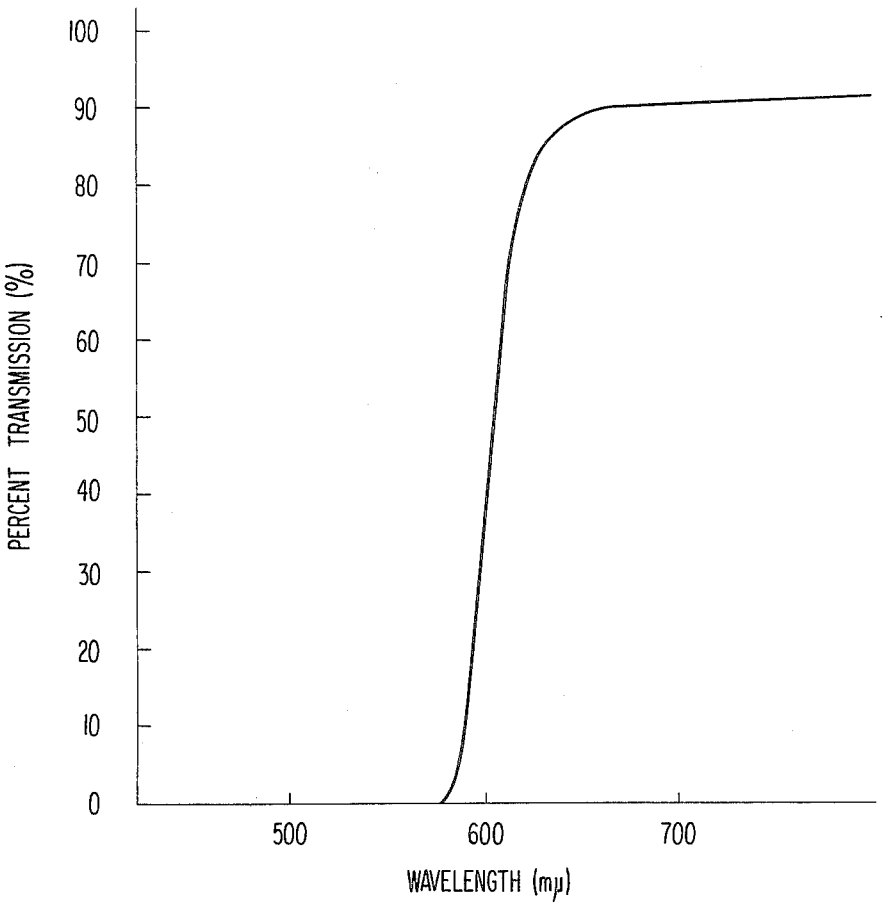
100
90
80
70
60
50
40
30
20
10
0
PERCENT TRANSMISSION (%)
500
600
700
WAVELENGTH (mμ)